US010621063B2

(12) United States Patent
Attias

(10) Patent No.: US 10,621,063 B2
(45) Date of Patent: Apr. 14, 2020

(54) SYSTEM AND METHOD FOR DYNAMIC DOMAIN-SPECIFIC SEQUENCE DIAGRAM VISUALIZATION

(71) Applicant: Cisco Technology, Inc., San Jose, CA (US)

(72) Inventor: Roberto Attias, Alameda, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 394 days.

(21) Appl. No.: 14/796,289

(22) Filed: Jul. 10, 2015

(65) Prior Publication Data

US 2017/0010945 A1    Jan. 12, 2017

(51) Int. Cl.
*G06F 11/32* (2006.01)
*G06F 11/30* (2006.01)
*G06F 11/34* (2006.01)

(52) U.S. Cl.
CPC .......... *G06F 11/328* (2013.01); *G06F 11/301* (2013.01); *G06F 11/3086* (2013.01); *G06F 11/3409* (2013.01)

(58) Field of Classification Search
CPC .. G06N 2/02; G06Q 10/06; G06F 3/00; G06F 8/34
See application file for complete search history.

(56) References Cited

U.S. PATENT DOCUMENTS

| 6,330,527 | B1 | 12/2001 | Jung et al. | |
|---|---|---|---|---|
| 6,807,583 | B2 | 10/2004 | Hrischuk et al. | |
| 7,428,734 | B2 * | 9/2008 | Kobylinski | G06F 11/079 |
| | | | | 714/E11.207 |
| 7,516,209 | B2 | 4/2009 | Raghuraman et al. | |
| 8,146,100 | B2 | 3/2012 | Kilian-Kehr | |
| 2005/0120330 | A1 * | 6/2005 | Ghai | G06F 9/542 |
| | | | | 717/101 |
| 2008/0244565 | A1 * | 10/2008 | Levidow | G06F 9/5038 |
| | | | | 717/176 |
| 2010/0115407 | A1 * | 5/2010 | Kim | G01C 21/367 |
| | | | | 715/708 |
| 2010/0131875 | A1 * | 5/2010 | Firminger | G06N 5/02 |
| | | | | 715/764 |
| 2011/0264424 | A1 * | 10/2011 | Miwa | G05B 23/0278 |
| | | | | 703/2 |

(Continued)

*Primary Examiner* — Jennifer N To
*Assistant Examiner* — Qi Wan
(74) *Attorney, Agent, or Firm* — Polsinelli PC

(57) ABSTRACT

A system, method and computer-readable storage devices for enhancing the presentation of structured log files. A system configured according to this disclosure can track events of a computing entity. The computing entity can be a state machine, a virtual machine, a thread, a process, a software component, or a hardware component. The computing entity can be any device that generates or contributes to an event log. The events can be tracked from at least one of a structured log file and a stream of event data, for example. The system can identify event types for the events. The system can identify relationships between the events, and generate a sequence diagram of the events. The sequence diagram can include visual indications of the relationships based on the event types. The system can further select an icon for each event from an event-specific icon directory based on event type.

20 Claims, 5 Drawing Sheets

(56) References Cited

U.S. PATENT DOCUMENTS

| | | | | |
|---|---|---|---|---|
| 2012/0124504 A1* | 5/2012 | Maybee | ............... | G06F 8/34 |
| | | | | 715/772 |
| 2013/0061171 A1* | 3/2013 | Kang | ............... | G06F 3/0481 |
| | | | | 715/800 |
| 2014/0325423 A1* | 10/2014 | Mohammad | ......... | G06Q 10/06 |
| | | | | 715/772 |
| 2016/0161277 A1* | 6/2016 | Park | ............... | G01C 21/343 |
| | | | | 701/419 |

* cited by examiner

SYSTEM AND METHOD FOR DYNAMIC DOMAIN-SPECIFIC SEQUENCE DIAGRAM VISUALIZATION

BACKGROUND

1. Technical Field

The present disclosure relates to visualizing log files and more specifically to domain-specific visualizations of log files to be more understandable to a human viewer.

2. Introduction

Distributed and concurrent systems can implement complex control flows spawning multiple concurrent components. For example, in the context of Openstack a northbound API request to create a virtual machine (VM) is implemented by various components handling different concerns, such as authentication, networking, VM spawning. Potentially each component in the system can produce log files or traces. Analyzing a particular flow execution requires inspection and correlation of multiple such files, which is not particularly suitable to a human being.

One common way to represent flow information for concurrent systems is sequence diagrams. Sequence diagram are an UML technique originally intended to capture flows and interactions at design time. Some tools can generate sequence diagrams out of traces or logs collected from a running system. However the amount of information visualized is typically much greater, and can include multiple flows interlaced with each other. This representation of sequence diagrams is mostly concerned with depicting interactions and activity blocks, and does not provide any type of visual clues to allow rapid identification of desired flows. Thus, the amount of information is simply overwhelming and, though all the information is displayed, the significance or meaning of the information is difficult for humans to decipher.

DETAILED DESCRIPTION

A system, method and computer-readable storage devices are disclosed which visually enhance sequence diagrams to facilitate visual inspection when diagrams include a large amount of information, such as sequence diagrams automatically constructed from log or trace files.

Figure 1:
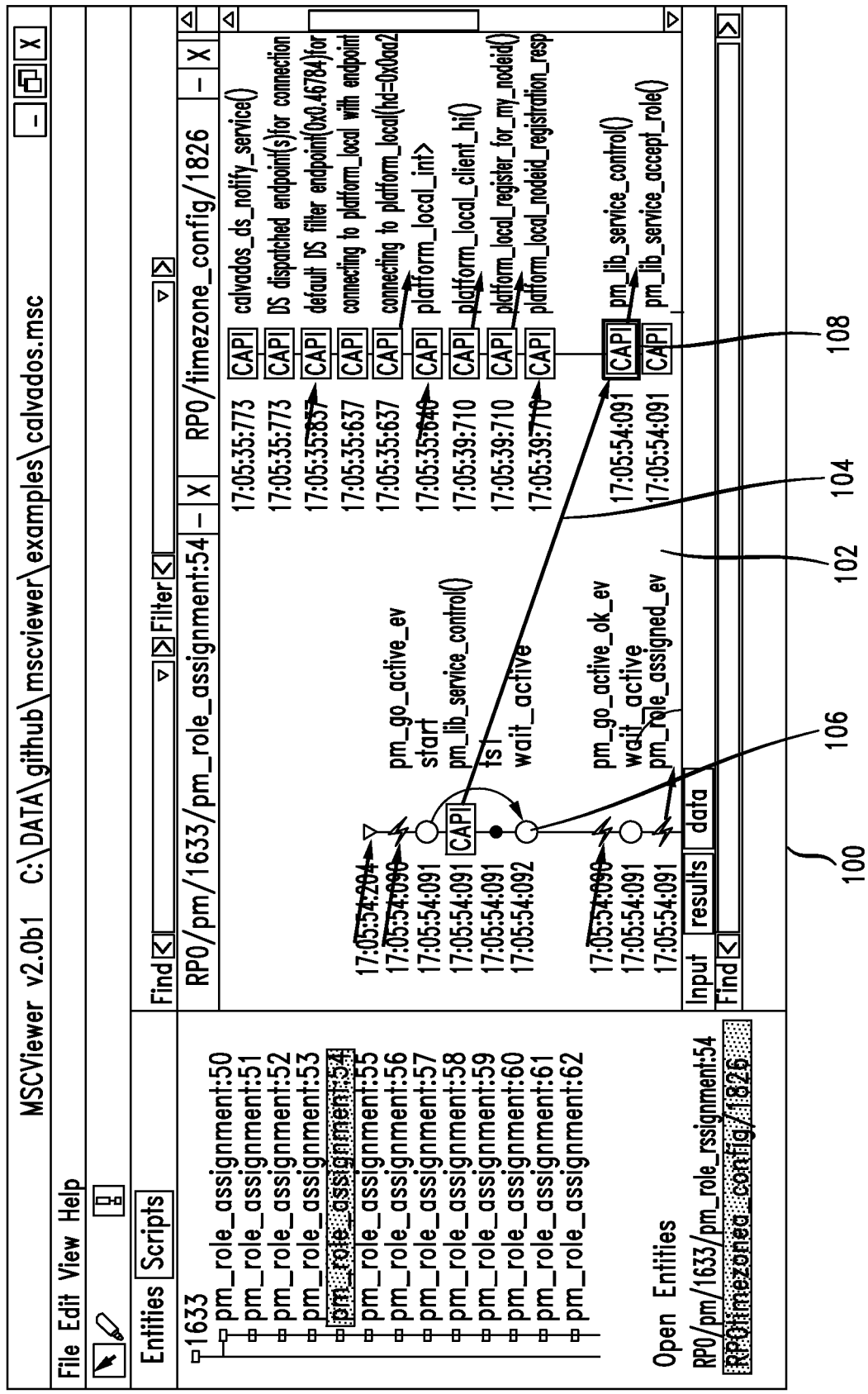
FIG. 1 illustrates an example enhanced log file.

FIG. 1 illustrates an example enhanced log file 102 in an example software tool 100 for graphical visualization of sequence diagrams from structured log files. While most of the examples presented herein are discussed in terms of a single log file, in practically every instance the tools 100 can apply equally to multiple related log files, such as the separate log file outputs from multiple hardware and/or software components acting in concert. Traditional sequence diagrams visualize interactions as arrows and local activities as "activate" blocks (rectangles on the life line of an entity). The tool 100 represents events from the structured log files with graphical icons 106, 108 or arrows 104 specific to the event type, and supplemented by additional metadata when needed. The additional metadata can include text in a popup, tooltip, or rollover, sounds, video clips, more detailed or larger graphical icons, an additional graphical emphasis on related events or relationships such as a blinking icon, a wobbly icon, a highlighted icon, and so forth. Thus, the tool 100 can render, instead of a straight wall of text entries from the log file, a graphically enhanced presentation of the data in the log file. The graphical enhancements can demonstrate relationships between collections of entries in the log file.

For example, the enhanced log file 102 of FIG. 1 visualizes interactions of two entities. The first entity is a state machine. The first visible event is a triangle, identifying the birth of the state machine. Below the birth of the state machine is an incoming interaction with a thunderbolt-shaped icon, representing a state machine event received by the state machine, which will cause a transition to be taken. The next, larger circle represents the event of leaving or entering a state of the state machine. Arrows represent taken transitions. So in this example, the state machine leaves the "start" state and enters the "wait_active" state due to event "pm_go_active_ev". In taking the transition, the state machine performs some additional actions, one of which is sending a particular type of message (CAPI) to the second entity.

The second entity is not a state machine, but a thread. The thread sends and receives various CAPI messages, but also it initiates and completes an asynchronous connection, as indicated by the icons with labels "connecting to . . . " and "connected to . . . ". As shown, a user aware of the particular domain specific notation used can quickly identify different type of events such as state machines interactions, reception of state machine events, sending/receiving CAPI messages, initiation/completion of interactions.

Figure 2:
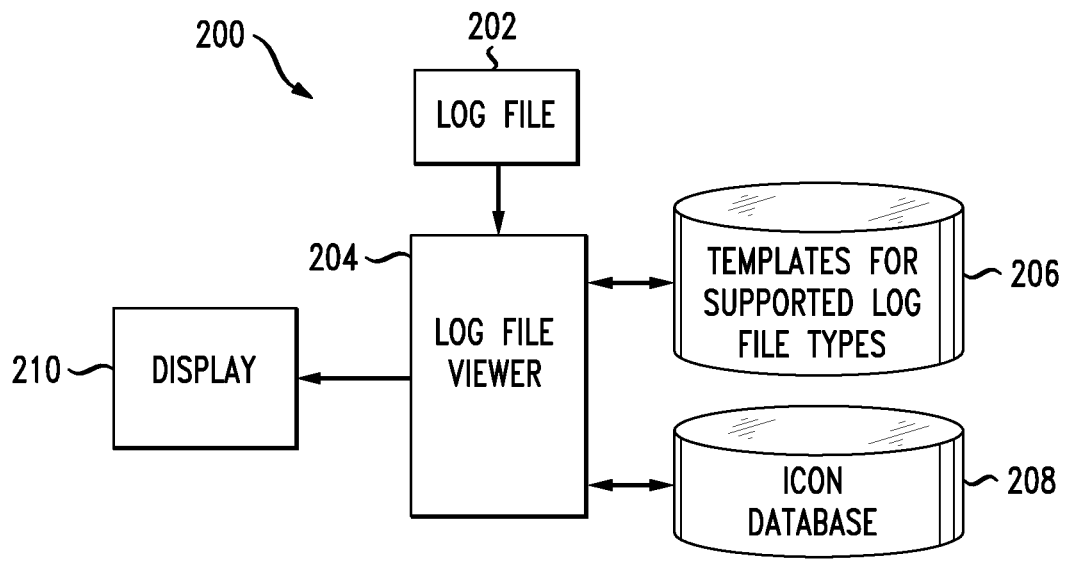
FIG. 2 illustrates a block diagram of an example system for enhancing log files.

FIG. 2 illustrates a block diagram of an example system 200 for enhancing log files with graphical elements. The system 200 can include tool 100 as in FIG. 1 in the form of a log file viewer 204 or similar software application. The viewer 204 receives a structured log file 202, whether loaded directly from a locally or remotely stored file, or streamed over a network, for example. The viewer can consult a templates database 206 for supported log file types. The templates database 206 can define different relationships and types of events to highlight, as well as rules for recognizing the relationships and rules for enhancing the presentation of the log file according to the various templates. The viewer 204 can also retrieve icons or graphical elements from an icon database 208. The icon database 208 and the templates database 206 can be related, such as the templates database 206 indicating a preferred or default set of corresponding icons in the icon database 208. However, the viewer 204 can receive user input to select a specific template and/or set of icons. The viewer 204 then overlays one or more icon or graphical element from the icon database 208 over at least part of the log file 202 on a display 210 or as graphical output to a video or image file.

In order to keep the viewer 204 more generically applicable to different types of event logs and structured log files, the viewer 204 can have no knowledge a priori regarding the particular event types and their graphical representation. When loading a log file 202, the viewer 204 can discover event types in the log file 202 and look for an icon corresponding to that event type in the icon database 208 or icon directory. The icon database can be a list of image files, such as PNG files corresponding to event files based on the file name. For example, a PNG file for an event file entry "pm_go_active_ev" can be named "pm_go_active_ev.PNG," and a PNG file for an event file entry "wait_active" can be named "wait_active.PNG."

Thus, the viewer 204 can provide a domain-specific graphical representation of events while remaining a generic tool able to display different types of events. Further, a user can specify a specific type perspective of the log file 202 that is of interest. A single type of log file can be presented differently to emphasize different aspects of the events contained therein that may be meaningful to different users. For example, a domain-specific graphical representation of network logs may highlight different events and relationships for a network security engineer than for a quality of service performance analyst, even though the underlying event logs contain the same information. This domain-specific graphical representation can highly enhance the visual separation of information and further facilitate interpretation of diagrams derived from structured log files.

The viewer 204 can provide an increased ability to visually navigate an extended sequence diagram, and can graphically identify regions of interest based on visual clues. The viewer 204 can allow a user to load different domain-specific sets of visual clues to be used with domain specific logs/traces, without modifying the tool. The viewer 204 can improve visual inspection of graphical representation of logs, resulting increased ease of debugging a system. The viewer allows the user to assign specific icons or visual cues to different types of state transitions in a state diagram generated from one or more structured log files.

Figure 3:
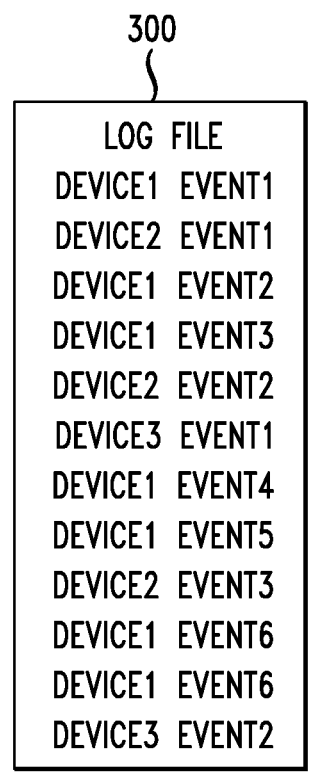
FIG. 3 illustrates an example traditional log file.

FIG. 3 illustrates an example traditional log file 300. In this traditional log file 300, the entries are simply a listing of text events. While this log file 300 contains a very simplistic set of log entries for device1, device2, and device3, the log file 300 can include many other details, such as a timestamp, a thread ID, a username, a message or descriptor, a status, a permission level, a network address, a unique identifier, a file name, a computer name, and so forth.

Figure 4:
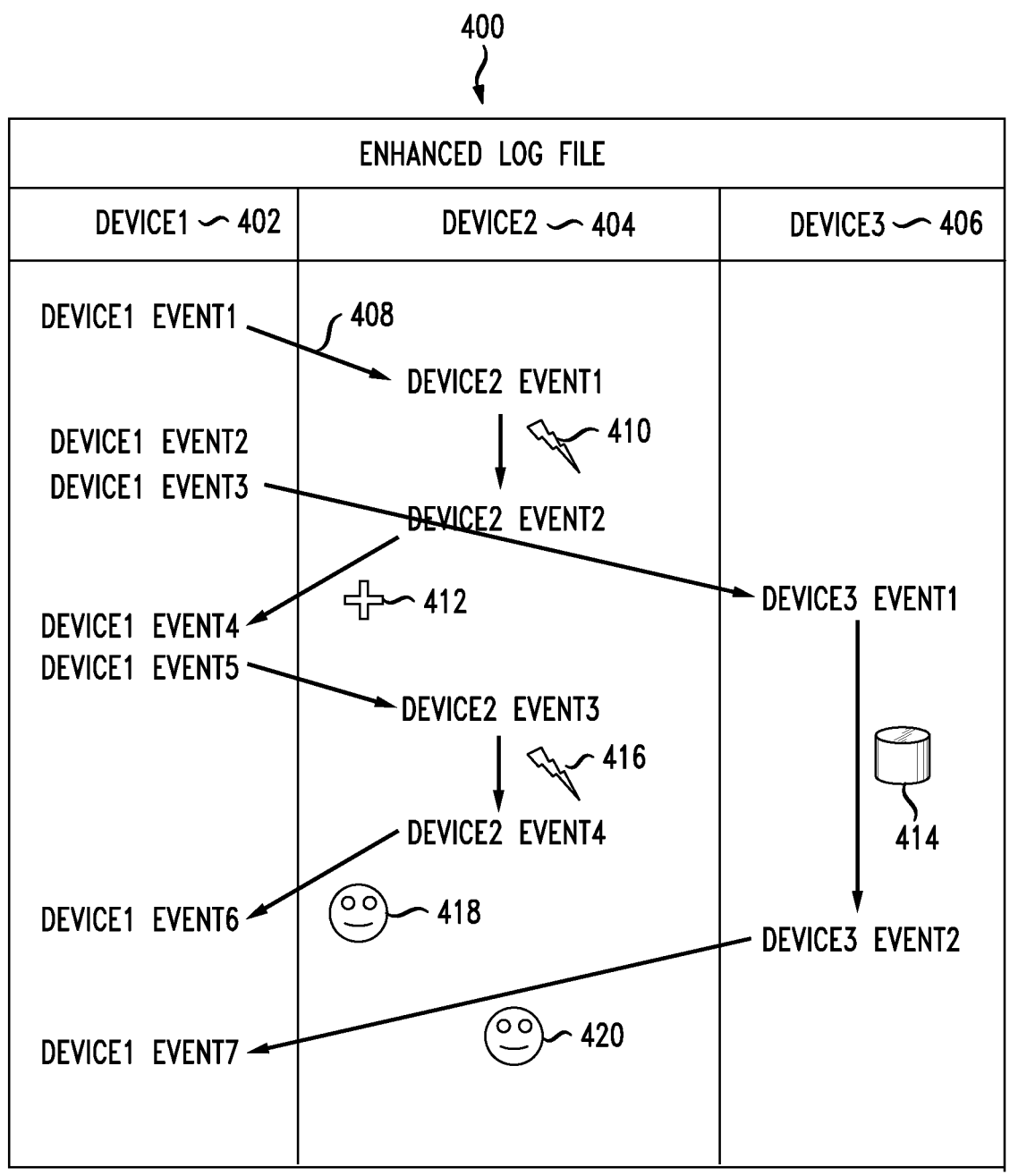
FIG. 4 illustrates an example enhanced version of a state machine based on the log file of FIG. 3.

FIG. 4 illustrates an example enhanced version of a state machine 400 based on the log file of FIG. 3. In this example, the state machine 400 identifies the three entities, device1, device2, and device3, in the structured log and organizes events for the three entities into three corresponding columns 402, 404, 406. The state machine 400 shows an arrow 408 from device1 event1 to device2 event1, signifying a request for device2 to perform an action. Lightning bolt 410 represents device2 attempting to perform the requested action. The cross 412 and arrow from device2 event2 represent reporting a failure to perform the requested action. However, before receiving the report of a failure, device1 event3 sends a request, represented by a bold arrow, to device3 to perform a different action. After receiving the request, device3 performs the requested action, indicated by database icon 414. Then device3 can report success to device1 with a circle icon 420. However, in the intervening time device3 took to perform the action, device1 sends another request to device2 to re-perform the previously failed action, represented as the second lightning bolt 416. This time, device2 succeeds and reports accordingly, as indicated by the circle 418. The actions and behaviors of this portion of a state machine 400 are far more understandable than the straight, unannotated text of FIG. 3. The enhanced display 400 can allow for interactions, as well. For example, a user can click on an icon, such as icon 414 to view more details from the underlying event logs.

This approach enables the user to apply a wider set of graphical representations which are more easily recognizable at a glance, so the user can quickly navigate the format and isolate the desired parts. The system rendering the graphical representations can be separated from the graphical elements themselves, so alternate graphical representations are pluggable for different domains. The system can display different logs with different icon sets specific to that tool, event, or communication type. Users can customize and share different libraries of icons and patterns for interpreting log files. In this way, a first user can create or modify one set of icons and share that set of icons with other users, who can, in turn, also modify the set of icons. The system can incorporate an icon library hosting feature to share icon libraries with other users, or to search a server hosting different icon libraries. Alternatively, users can create or download other icon libraries and install them in the system, or simply save them on a local machine for later use.

Figure 5:
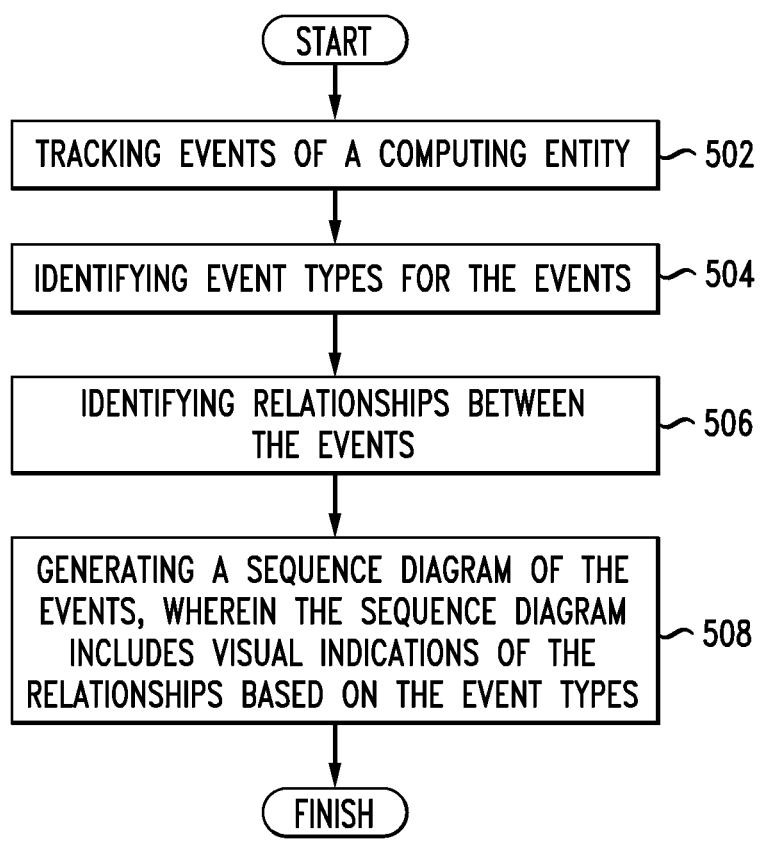
FIG. 5 illustrates an example method embodiment.
Figure 6:
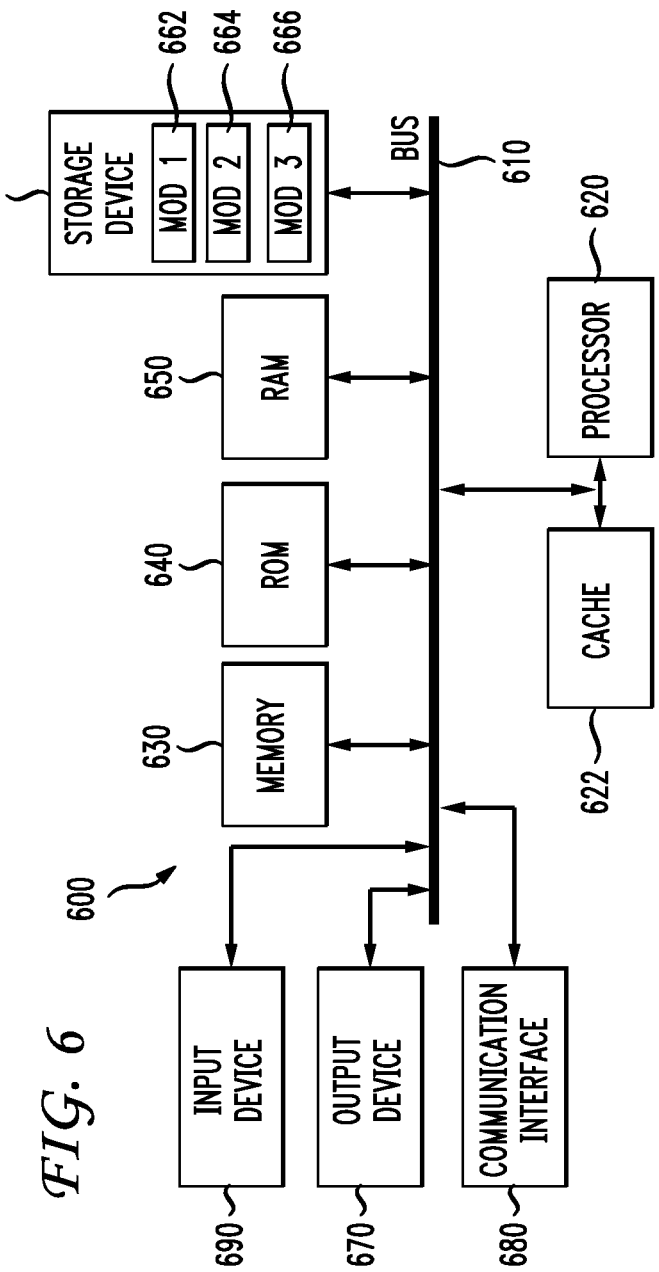
FIG. 6 illustrates an example system embodiment.

Having disclosed some basic system components and concepts, the disclosure now turns to the exemplary method embodiment shown in FIG. 5. For the sake of clarity, the method is described in terms of an exemplary system 600 as shown in FIG. 6 configured to practice the method. The steps outlined herein are exemplary and can be implemented in any combination thereof, including combinations that exclude, add, or modify certain steps.

A system configured according to this disclosure can track events of a computing entity (502). The computing entity can be a state machine, a virtual machine, a thread, a process, a software component, a logical entity, or a hardware component. The computing entity can be any device that generates or contributes to an event log. The events can be tracked from at least one of a structured log file and a stream of event data, for example. The system can identify event types for the events (504). The system can identify relationships between the events (506). Then the system can generate a sequence diagram of the events, wherein the sequence diagram includes visual indications of the relationships based on the event types (508). The system can further select an icon for each event from an event directory based on event type. The icons can be selected from an event-specific icon directory. The system can optionally receive user input to switch from a first icon set to a second icon set, wherein each of the first icon set and the second icon set targets a different domain with different, domain-specific visual cues, and transition the visual indications based on the second icon set. The system can identify a region of interest within the sequence diagram, and highlight the region of interest with a visual indicator. The region of interest can be identified based on at least one of user input, a user profile, and data contained in a file associated with the events.

The system can render at least a portion of the sequence diagram on a display, and present controls on the display for a user to visually navigate within the sequence diagram, such as scrolling, zooming in and out, selecting one or more element of the sequence diagram, drill down to the associated underlying log file data for a particular graphical element, search for other instances of a particular pattern of interaction, and so forth. The user can toggle display of all or part of the graphical elements, in order to view the underlying data in an unmodified or non-enhanced form.

In one variation, the system can look in the log file for clues or directives for where to find appropriate sets of icons for enhanced display of that log file. For example, the log file can include a URL to an icon set repository for use with that type of log file. Alternatively, the system can use pattern recognition or some other recognition mechanism to determine a type of log file, and automatically find an appropriate library of icons for use with that log file. The system can generate and display a legend describing the meanings of the various icons in the enhanced graphical display of the log file.

Various embodiments of the disclosure are described in detail below. While specific implementations are described, it should be understood that this is done for illustration purposes only. Other components and configurations may be used without parting from the spirit and scope of the disclosure.

A brief description of a basic general purpose system or computing device in FIG. 6 which can be employed to practice the concepts, methods, and techniques disclosed is illustrated. These variations shall be described herein as the various embodiments are set forth. The disclosure now turns to FIG. 6.

With reference to FIG. 6, an exemplary system and/or computing device 600 includes a processing unit (CPU or processor) 620 and a system bus 610 that couples various system components including the system memory 630 such as read only memory (ROM) 640 and random access memory (RAM) 650 to the processor 620. The system 600 can include a cache 622 of high-speed memory connected directly with, in close proximity to, or integrated as part of the processor 620. The system 600 copies data from the memory 630 and/or the storage device 660 to the cache 622 for quick access by the processor 620. In this way, the cache provides a performance boost that avoids processor 620 delays while waiting for data. These and other modules can control or be configured to control the processor 620 to perform various operations or actions. Other system memory 630 may be available for use as well. The memory 630 can include multiple different types of memory with different performance characteristics. It can be appreciated that the disclosure may operate on a computing device 600 with more than one processor 620 or on a group or cluster of computing devices networked together to provide greater processing capability. The processor 620 can include any general purpose processor and a hardware module or software module, such as module 1 662, module 2 664, and module 3 666 stored in storage device 660, configured to control the processor 620 as well as a special-purpose processor where software instructions are incorporated into the processor. The processor 620 may be a self-contained computing system, containing multiple cores or processors, a bus, memory controller, cache, etc. A multi-core processor may be symmetric or asymmetric. The processor 620 can include multiple processors, such as a system having multiple, physically separate processors in different sockets, or a system having multiple processor cores on a single physical chip. Similarly, the processor 620 can include multiple distributed processors located in multiple separate computing devices, but working together such as via a communications network. Multiple processors or processor cores can share resources such as memory 630 or the cache 622, or can operate using independent resources. The processor 620 can include one or more of a state machine, an application specific integrated circuit (ASIC), or a programmable gate array (PGA) including a field PGA.

The system bus 610 may be any of several types of bus structures including a memory bus or memory controller, a peripheral bus, and a local bus using any of a variety of bus architectures. A basic input/output (BIOS) stored in ROM 640 or the like, may provide the basic routine that helps to transfer information between elements within the computing device 600, such as during start-up. The computing device 600 further includes storage devices 660 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 660 can include software modules 662, 664, 666 for controlling the processor 620. The system 600 can include other hardware or software modules. The storage device 660 is connected to the system bus 610 by a drive interface. The drives and the associated computer-readable storage devices provide nonvolatile storage of computer-readable instructions, data structures, program modules and other data for the computing device 600. In one aspect, a hardware module that performs a particular function includes the software component stored in a tangible computer-readable storage device in connection with the necessary hardware components, such as the processor 620, bus 610, display 670, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 600 is a small, handheld computing device, a desktop computer, or a computer server. When the processor 620 executes instructions to perform "operations", the processor 620 can perform the operations directly and/or facilitate, direct, or cooperate with another device or component to perform the operations.

Although the exemplary embodiment(s) described herein employs the hard disk 660, other types of computer-readable storage devices which can store data that are accessible by a computer, such as magnetic cassettes, flash memory cards, digital versatile disks (DVDs), cartridges, random access memories (RAMs) 650, read only memory (ROM) 640, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 600, an input device 690 represents any number of input mechanisms, such as a microphone for speech, a touch-sensitive screen for gesture or graphical input, keyboard, mouse, motion input, speech and so forth. An output device 670 can also be one or more of a number of output mechanisms known to those of skill in the art. In some instances, multimodal systems enable a user to provide multiple types of input to communicate with the computing device 600. The communications interface 680 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 620. The functions these blocks represent may be provided through the use of either shared or dedicated hardware, including, but not limited to, hardware capable of executing software and hardware, such as a processor 620, that is purpose-built to operate as an equivalent to software executing on a general purpose processor. For example the functions of one or more processors presented in FIG. 6 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 640 for storing software performing the operations described below, and random access memory (RAM) 650 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 600 shown in FIG. 6 can practice all or part of the recited methods, can be a part of the recited systems, and/or can operate according to instructions in the recited tangible computer-readable storage devices. Such logical operations can be implemented as modules configured to control the processor 620 to perform particular functions according to the programming of the module. For example, FIG. 6 illustrates three modules Mod1 662, Mod2 664 and Mod3 666 which are modules configured to control the processor 620. These modules may be stored on the storage device 660 and loaded into RAM 650 or memory 630 at runtime or may be stored in other computer-readable memory locations.

One or more parts of the example computing device 600, up to and including the entire computing device 600, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 620 can include all types of processors disclosed herein, including a virtual processor. However, when referring to a virtual processor, the processor 620 includes the software components associated with executing the virtual processor in a virtualization layer and underlying hardware necessary to execute the virtualization layer. The system 600 can include a physical or virtual processor 620 that receive instructions stored in a computer-readable storage device, which cause the processor 620 to perform certain operations. When referring to a virtual processor 620, the system also includes the underlying physical hardware executing the virtual processor 620.

Embodiments within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, network routers, wearable devices, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

I claim:

1. A method comprising:
    tracking, via a computing device, a first plurality of events of a first computing entity and a second plurality of events from a second computing entity, the first plurality of events and the second plurality of events tracked from at least one of a structured log file or a stream of event data from each of the first computing entity and the second computing entity;
    identifying event types for the first plurality of events and the second plurality of events to yield identified event types;
    identifying relationships between the first plurality of events and the second plurality of events across the first computing entity and the second computing entity to yield identified relationships, the identified relationships based on the identified event types for the first plurality of events and the second plurality of events; and generating a sequence diagram of the first plurality of events and the second plurality of events, the sequence diagram including visual indications of the identified event types and the identified relationships based on the identified event types, the visual indications including a connection line between a pair of events, the pair of events including a first event of the first plurality of events and a second event of the second plurality of events, the first plurality of events arranged via a first linear arrangement, the second plurality of events arranged via a second linear arrangement extending parallel to the first linear arrangement of the first plurality of events.

2. The method of claim 1, wherein at least one of the first computing entity or the second computing entity is a state machine, a thread, or a logical entity.

3. The method of claim 1, wherein the first plurality of events and the second plurality of events are tracked from a plurality of structured log files output from multiple hardware and/or software components acting in concert.

4. The method of claim 1, further comprising:
selecting different icons for different ones of the first plurality of events and the second plurality of events from an event directory based on the identified event types.

5. The method of claim 4, wherein the different icons are selected from an event-specific event directory.

6. The method of claim 4, further comprising:
receiving user input to switch from a first icon set to a second icon set, wherein each of the first icon set and the second icon set targets a different domain with different, domain-specific visual cues; and
transitioning the visual indications based on the second icon set.

7. The method of claim 1, further comprising:
rendering at least a portion of the sequence diagram on a display; and
presenting controls on the display to visually navigate within the sequence diagram.

8. The method of claim 1, further comprising:
identifying a region of interest within the sequence diagram; and
highlighting the region of interest with a visual indicator.

9. The method of claim 8, wherein the region of interest is identified based on at least one of user input, a user profile, and/or data contained in a file associated with first plurality of events and/or the second plurality of events.

10. A system comprising:
a processor;
a memory storing instructions which, when executed by the processor, cause the processor to perform operations comprising:
tracking a first plurality of events of a first computing entity and a second plurality of events of a second computing entity, the first plurality of events and the second plurality of events tracked from at least one of a structured log file or a stream of event data from each of the first computing entity and the second computing entity;
identifying event types for the first plurality of events and the second plurality of events to yield identified event types;
identifying relationships between the first plurality of events and the second plurality of events across the first computing entity and the second computing entity to yield identified relationships, the identified relationships based on the identified event types for the first plurality of events and the second plurality of events; and
generating a sequence diagram of the first plurality of events and the second plurality of events, the sequence diagram including visual indications of the identified event types and the identified relationships based on the identified event types, the visual indications including a connection line between a pair of events, the pair of events including a first event of the first plurality of events and a second event of the second plurality of events, the first plurality of events arranged via a first linear arrangement, the second plurality of events arranged via a second linear arrangement extending parallel to the first linear arrangement of the first plurality of events.

11. The system of claim 10, wherein at least one of the first computing entity or the second computing entity is a state machine, a thread, or a logical entity.

12. The system of claim 10, wherein the first plurality of events and the second plurality of events are tracked from a plurality of structured log files output from multiple hardware and/or software components acting in concert.

13. The system of claim 10, the memory storing instructions which, when executed by the processor, cause the processor to perform operations further comprising:
selecting different icons for different ones of the first plurality of events and the second plurality of events from an event directory based on the identified event types.

14. The system of claim 13, wherein the different icons are selected from an event-specific event directory.

15. The system of claim 13, the memory storing instructions which, when executed by the processor, cause the processor to perform operations further comprising:
receiving user input to switch from a first icon set to a second icon set, wherein each of the first icon set and the second icon set targets a different domain with different, domain-specific visual cues; and
transitioning the visual indications based on the second icon set.

16. The system of claim 10, the memory storing instructions which, when executed by the processor, cause the processor to perform operations further comprising:
rendering at least a portion of the sequence diagram on a display; and
presenting controls on the display to visually navigate within the sequence diagram.

17. The system of claim 10, the memory storing instructions which, when executed by the processor, cause the processor to perform operations further comprising:
identifying a region of interest within the sequence diagram;
and highlighting the region of interest with a visual indicator.

18. The system of claim 17, wherein the region of interest is identified based on at least one of user input, a user profile, and/or data contained in a file associated with the events.

19. A non-transitory computer-readable storage device storing instructions which, when executed by a computing device, cause the computing device to perform operations comprising:

tracking a first plurality of events of a first computing entity and a second plurality of events of a second computing entity, the first plurality of events and the second plurality of events tracked from at least one of a structured log file or a stream of event data from each of the first computing entity and the second computing entity;

identifying event types for the first plurality of events and the second plurality of events to yield identified event types;

identifying relationships between the first plurality of events and the second plurality of events across the first computing entity and the second computing entity to yield identified relationships, the identified relationships based on the identified event types for the first plurality of events and the second plurality of events; and generating a sequence diagram of the first plurality of events and the second plurality of events, the sequence diagram including visual indications of the identified event types and the identified relationships based on the identified event types, the visual indications including a connection line between a pair of events, the pair of events including a first event of the first plurality of events and a second event of the second plurality of events, the first plurality of events arranged via a first linear arrangement, the second plurality of events arranged via a second linear arrangement extending parallel to the first linear arrangement of the first plurality of events.

20. The non-transitory computer-readable storage device of claim 19, the instructions, when executed by the computing device, causing the computing device to perform operations further comprising:

selecting different icons for different ones of the first plurality of events and the second plurality of events from an event directory based on event type, the different icons selected from an event-specific event directory;

receiving user input to switch from a first icon set to a second icon set, each of the first icon set and the second icon set targeting a different domain with different, domain-specific visual cues; and transitioning the visual indications based on the second icon set.

\* \* \* \* \*